INVENTORS
ANDREW E. ABRAMSON
ANDREW F. KITCHAR
BY
Dugger, Johnson & Westman
ATTORNEYS

United States Patent Office 3,447,994
Patented June 3, 1969

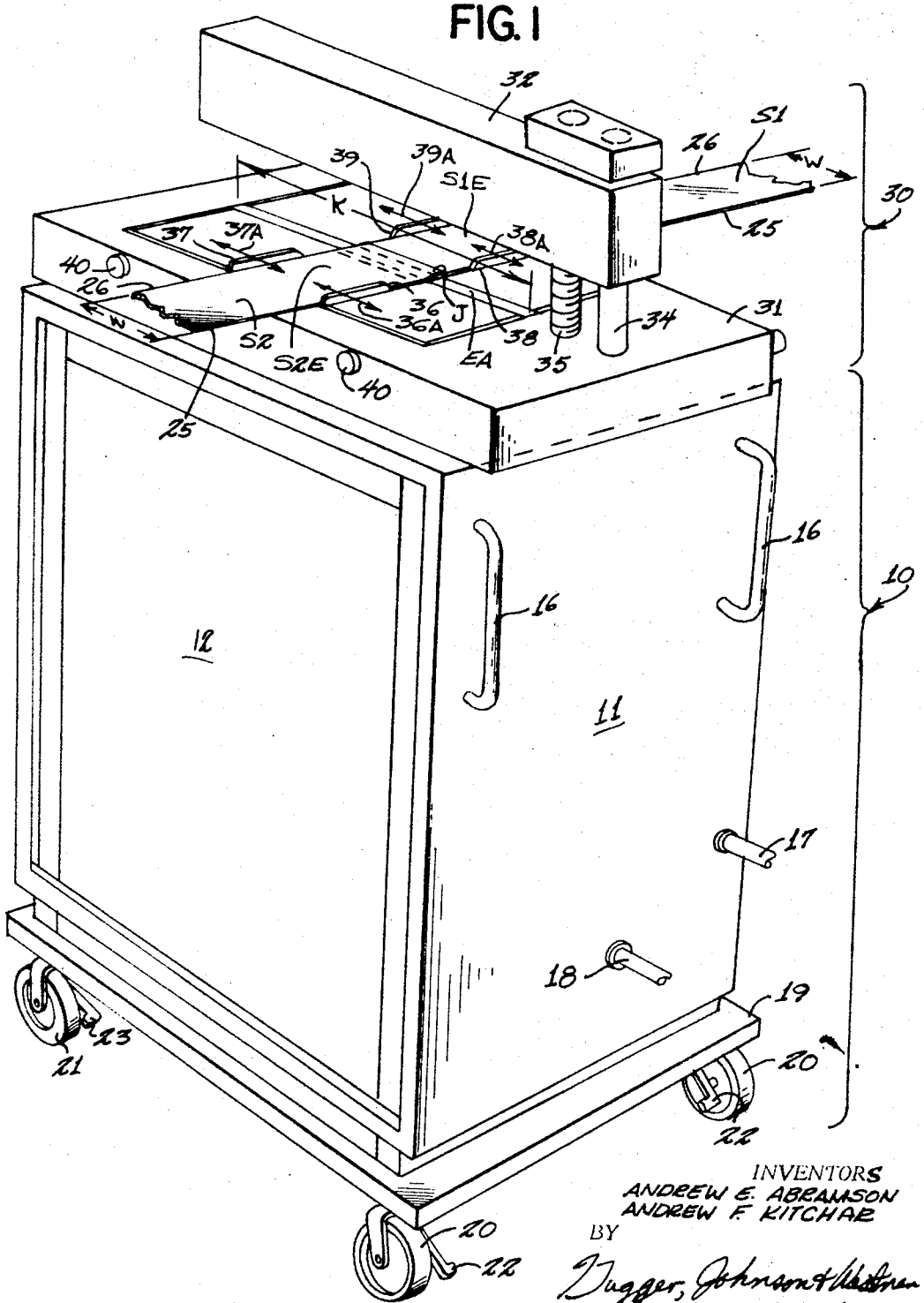

3,447,994
MACHINE ALIGNMENT IN STRIP JOINING
Andrew E. Abramson and Andrew F. Kitchar, Excelsior, Minn., assignors, by mesne assignments, to Research, Incorporated, a corporation of Minnesota
Filed Jan. 24, 1966, Ser. No. 522,751
Int. Cl. B65h 21/00, 23/02
U.S. Cl. 156—502    5 Claims

ABSTRACT OF THE DISCLOSURE

In the lap joining of tenuous strip materials it is essential to achieve and preserve accurate alignment. The invention accomplishes this by mounting the joint forming device for rotation relative to a wheeled machine frame. The whole wheel frame is moved into an approximately correct position for the lap, after which the joint forming device is rotated on the frame to orient the lap joint as desired with reference to the aligned strips. Locks for the frame wheels and rotational adjustments and strip edge guides are provided.

---

Figure 3:
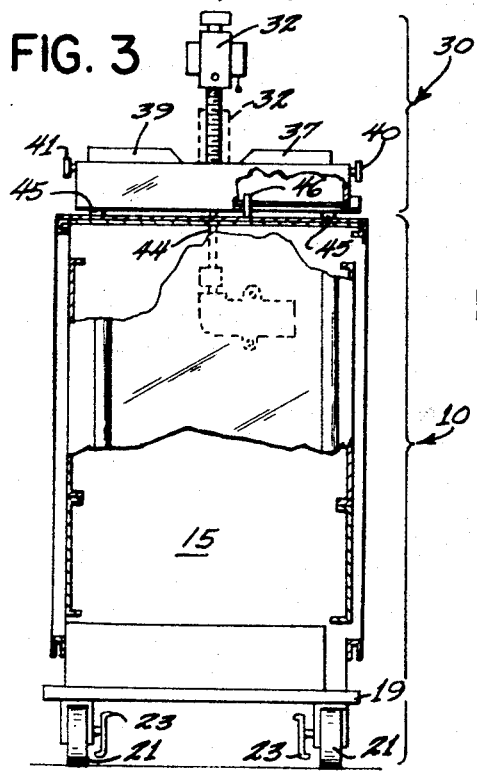

This invention relates to machine alignment in strip joining. In the joining of strip materials, by lap or butt attachment, it is, in most instance, essential that the two strips being joined should be carefully aligned so that after joinder the tension throughout the length of the joined strips, across the joint, will be uniform.

Many strip materials such as strips of plastic sheeting, are quite difficult to manage since they are extremely thin, many have a tendency to curl and when the slightest forces, as for example air currents, are imposed on the strips they tend to bend and become disarranged. Consequently in the joinder of strip materials, especially plastic materials, it is desirable that the two strips be carefully aligned by suitable guides, and when thus held in alignment that the joinder should be accomplished. In many operations, the apparatus for effecting the joinder is fairly sizable, and especially where strip materials are being wound, the alignment of the strips is effected by means of guides, etc. on the various machines or reels carrying the two strips, which are to be joined. Also it is desirable that the machines for effecting the joinder should be capable of being moved from one location to another, so that it can be used for joining strips on different machines. Consequently it is desirable that the machine for effecting joinder be made portable.

It has been discovered that in the use of a joining machine of portable type that it is difficult to move the machine accurately into position with the alignment of the strips which are to be joined. This is because the joining machine is fairly sizable, it must be moved from place to place, and the positions of the strips to be joined are usually fixed by other devices.

It is an object of the present invention to provide a mounting for a joining machine for the joinder of strips, which provides for the portability of the strip joining machine so it can be moved from one place to another, and at the same time provide for the rapid alignment of the joining device of the strip joining machine in respect to the strip ends which are to be joined.

It is a more specific object of the invention to provide a portable joining machine, capable of being moved into place and its position approximately fixed with reference to the strip ends and to provide means for then accurately adjusting the position of the joining device per se of the strip joining machine with reference to the strip ends which are to be joined.

It is a further object of the invention to provide a portable machine for the joining of the ends of plastic strips.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 2:
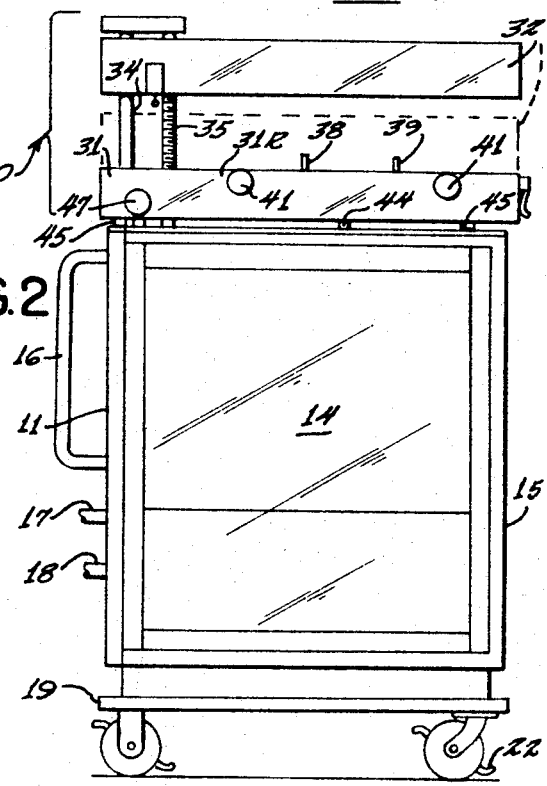
Figure 4:
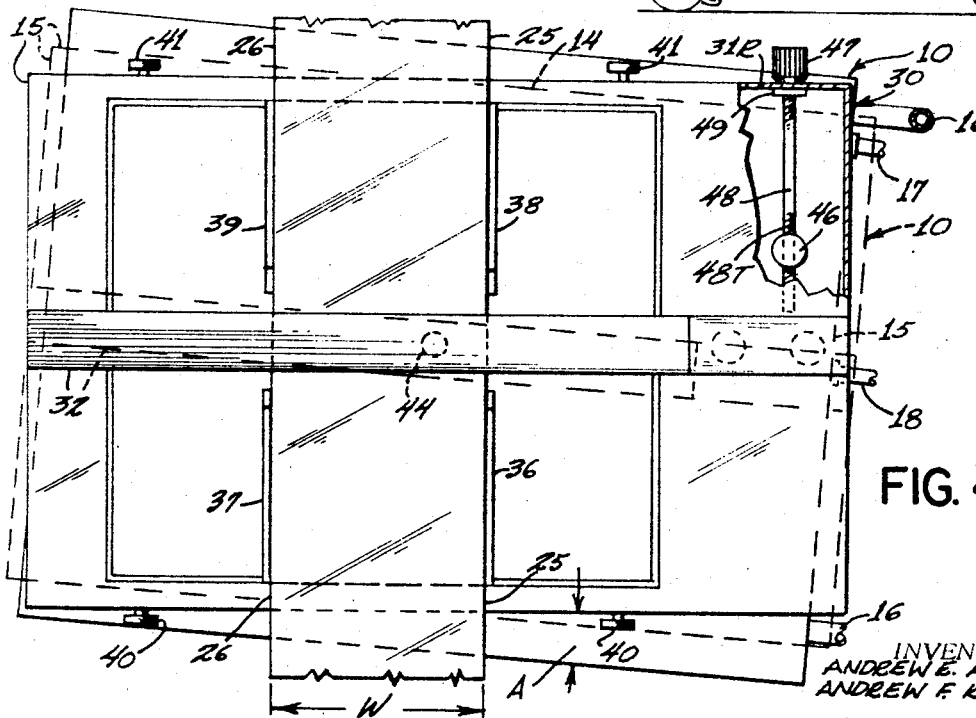

The invention is illustrated with reference to the drawings wherein FIGURE 1 is a perspective view of an illustrative embodiment of the invention;

FIGURES 2 and 3 are respectively side and front elevational views of the machine shown in FIGURE 1. For purposes of nomenclature FIGURE 2 may be considered as the left side view of the machine, when facing the front of the machine which is to the right in FIGURE 2 and is shown in FIGURE 3; and FIGURE 4 is a plan view of the machine, illustrating the mode of adjustment of the machine.

Throughout the drawings the same numerals refer to the same parts.

Referring to the drawings, the machine comprises a machine base shown generally opposite bracket 10 having a rear side 11, the right side 12, the left side 14 and front 15 and this machine base is a sturdy structure having removable side panels, and on the rear face there are handles 16—16 for ease of manipulation. Service connections for electricity and air are shown at 17 and 18. The side, front and back panels of the machine are made removable so as to provide easy access to the interior which houses such functional equipment of the machine as is not required to be at the top. At the bottom of the machine base 10 there is a platform 19 having caster wheels 20, 20 and non-castering wheels 21, 21. These wheels are provided with locks as at 22 for the castering wheels and at 23 for the non-castering wheels. Assuming that all of the wheel locks are in the unlocked position, then by gripping the handle 16, the entire machine base may be wheeled from place to place in a factory so as to be adjacent the strip ends which are to be joined.

In FIGURE 1 the two strips S1 and S2 are, in this illustration to be joined at a joint by any suitable joining procedure. The joining procedure, per se, may be varied to suit the materials and may be by sewing, by adhesion, or by welding, the latter being mostly used for plastics. In the illustration herein, the joining device shown generally opposite the bracket 30 will be any suitable device for joining the particular materials of which the strips S1 and S2 are composed. As a specific example, the joining device 30, may be of the type shown in our co-pending application, Ser. No. 484,545, filed Sept. 2, 1965, now Patent No. 3,384,526, or as shown in our application executed and filed of even date herewith entitled, "Method and Apparatus for Lap Joinder of Plastic Sheets," Ser. No. 522,786. In the illustration shown in FIGURE 1, the sheets S1 and S2 may be assumed to be of plastic and they are to be joined by a lap weld in the area J.

For purposes of the present invention, the width W of the strips S1 and S2 is defined by the edges 25 and 26. These edges will be assumed to be aligned by other mechanisms, such as for example the strip sheering and winding machines used for handling the strips S1 and S2. Thus where producing a roll of strip having a width W, a reeling machine will receive the strip S1, until the end of the strip is reached, after which another strip S2 is lap welded and the reeling can be continued. At the top of the machine 10 there is a joining machine shown generally opposite the bracket 30 having a base 31 and a joining head 32. The joining head is supported for vertical movement on a smooth post 34 and it is raised and lowered by the motor driven screw 35 by means of controls, not illustrated, so that the joining head 32 can be moved from its raised position shown in full lines in FIGURES 1, 2 and 3 to a lowered position as shown in dotted lines in FIGURES 2 and 3. In the latter position the joining head 32 clamps the two ends of the strips S1 and S2 over the effective area where they are to be joined and presses them against the area J. Heat is then applied by the head 32 and/or the head 32 and base 31 throughout the strip area EA, see FIGURE 1, which crosses the strips S1 and S2 at the area J, where welding takes place. The methods and mechanisms for accomplishing the lap welding are described and claimed in our co-pending applications, aforesaid.

The joining head 32 will not, however, be lowered until the strips S1 and S2 are carefully positioned at right angle (or some desired predetermined angle) in respect to the effective area EA of the joining machine. In the illustration herein the lap weld is shown at right angles to the length of the two strips S1 and S2. When the whole machine shown opposite the brackets 10 and 30, is wheeled up to the as yet unattached ends of the strips S1 and S2, there can be no assurance that the joining area EA will be positioned at just the desired angle to the lengths of the two strips S1 and S2, nor for, that matter, is there any assurance that the two ends of the strips will meet at any particular position across the entire dimension K which defines the length of the effective area where welding can be accomplished in the joining machine. Therefore, in order to support the strips S1 and S2 preparatory to joining, the joining machine 30 is provided with guides (fences) at 36, 37, 38 and 39. These are made so they can be individually adjustable to positions along the dimension K as shown by the arrows 36A, 39A, and once the adjustment of the guidies 36–39 has been made so that they lightly touch the edges 25, 25 and 26, 26 of the strips S1 and S2, the adjustment of the guides 36 and 37 is locked by means of lock screws 40, 40, and the adjustment of the guides 38 and 39 are similarly locked by a pair of lock screws 41. Therefore, in setting up the machine 10, 30, preparatory to making a joint at J, the machine 10, 30 is wheeled over to the as yet unattached ends of the strips S1 and S2, and positioned as nearly as possible, and the wheel locks 22, 23 are then moved to the locking position. At this point, however, there is no assurance that the guides 36–39 will be at or near the edges 25, 26 of the strips, or that they will be aligned exactly parallel with the edge strips. As previously explained, the ready adjustability of the guides 36–39 to any position along the effective dimension K of the joining area EA, permits the adjustment of the guides until they are brought near the edges of the strip, but the angular adjustment of the guides, so that they will lie parallel to the edges of the strips, is as yet to be accomplished. For the purpose of making this angular adjustment, the entire joining machine 30 is mounted so as to be rotatable on the base 10. Thus at the center of the base 10 there is provided a pivot 44, see FIGURE 4, forming a post attached to the base 10 and extending up into the bottom of the base 31 of the joining machine 30. Also provided at the bottom of the base 31 are a plurality of feet 45, which extend down from the lower portion of the base 31 and slide on the smooth upper surface of the machine base 10. Consequently the entire joining machine 30 can be rotated with reference to the base 10. In order to effect rotation of the joining machine 30, with reference to the base 10, there is provided on base 10 a post 46 which extends upwardly above the top surface of base 10 and into the open interior of the base 31 of the joining machine. On the right sidewall 31R of the base 21 (see FIGURE 4) there is provided an adjustment knob 47 having a shaft 48 which extends through wall 31R and is held against endwise movement by the interior collar 49. The shaft 48 is threaded at 48T into threads in the post 46. The post 46 is journaled on base 10 so as to be slightly rotatable with reference to the base 10. Therefore, by rotating the knob 47, the screw 48 and collar 49 can be moved with reference to the post 46 which is, as previously explained, attached to the machine base 10, and hence, within the limits of the screw threads 48T, this causes the entire joining machine 30 to be rotated with reference to the base 10, and in this way the joining machine can be brought into a position so that the guides 36–39 are exactly parallel to the edges 25 and 26 of the two strips S1 and S2, which are to be joined together. An angular adjustment of 5° from a condition where the base 10 and machine 30 are square with each other is usually sufficient, but this can obviously be increased, if needed. When this condition of parallelism is established, the guides 36–39 are re-adjusted into a position to just touch the edges of the strips S1 and S2 and the guides are then again locked by tightening screws 40, 41.

Therefore, in preparing for the joining of the strips S1 and S2 the machine 10 is first wheeled into place and the position of the base 10 is then fixed by setting the wheel locks 22, 23. Then the entire joining entity 30 is rotated by means of the adjustment 47, until the guides 36–37 are brought into a condition of parallelism with the edges of the strips S1 and S2, and then the guides are brought into light contact with the edges of the strips S1 and S2, whereupon the guides are locked.

In FIGURE 4 the joining machine 30 is shown in full lines at right angles (square) with the strips S1 and S2, and is at an angle A to the base 10, this adjustment being provided by the setting of screw and knobs 47, 48. The joining machine 30 is shown also in dotted lines, where it is set true (square) with the base 10.

Any suitable means may be used for holding the strips S1 and S2 flat against the upper surface of base 31 in the area S1E and S2E, so that the ends of the strips are either butted or lapped, depending upon the type of attachment that is to be made between them. One desirable vacuum device for holding the strips in the areas S1E and S2E is disclosed in our co-pending application, Ser. No. 522,752, executed and filed of even date herewith, entitled Apparatus for Strip Trimming Preparatory to Lap Joinder, now Patent No. 3,354,769, and such strip holding device may be used herein, regardless of the materials of which the strips are composed or their mode of joinder. After thus positioning the machine relative the strips, the joining function is accomplished, and this depends upon the kind of joining which is accomplished, materials of which the strips are composed, and the kind of joint and mode of joining. In this specific example the joining is accomplished by heat welding the lapped ends of the plastic strips. This is accomplished by bringing down the joining machine head 32 to its lower position, after which the welding is completed. The head is then elevated again to its full line position. The guides may then be loosened and moved away from the edges of the strip which are then joined together, and after loosening the latches 22, 23, the welded together strips S1-S2 are lifted to clear the guides 36–39 and entire machine 10, 30 can be backed away from the then joined strips and taken elsewhere.

What is claimed is:

1. In a machine for joining the ends of aligned strip material comprising a machine frame, wheels on said frame to facilitate moving it into an approximately correct position for use, locks on the machine frame for holding the machine frame from moving after being thus positioned, a device for joining ends of strip material mounted on the machine frame for rotation thereon about an upright axis, and manual means connecting the machine frame and device for rotating the device with reference to the machine frame for aligning said device accurately with reference to the aligned strip material, preparatory to joining the ends thereof.

2. The machine specified in claim 1 further characterized in that edge guides are provided on the device for joining, said guides being mounted for adjustable translatable movement on said device for bringing them into alignment with the edges of the strips to be joined, and lock means for holding the guides.

3. The machine specified in claim 1 further characterized in that said manual means is an adjustment screw.

4. The machine specified in claim 1 further characterized in that the device for joining is a device for heat welding plastic material.

5. The machine specified in claim 1 further characterized in that the device for joining includes a base frame on which the ends of the strips to be joined are adapted to be laid in alignment preparatory to joining, and a joining entity mounted for translatory movement thereon from a raised position wherein it is elevated above the ends of the strips to a lowered position wherein it contacts the strips, and means on the base frame and connected to the joining entity located at one side of the base frame and one end of said entity for translating said entity, the space between the base frame and entity when the entity is elevated being clear at one end of the entity for removal of the entire joining machine away from the joined ends of the strips after the joining of the ends of the strips is completed.

References Cited
UNITED STATES PATENTS

| | | | |
|---|---|---|---|
| 3,000,434 | 9/1961 | Nelson et al. | 156—502 |
| 3,035,510 | 5/1962 | Carpenter et al. | 100—226 X |
| 3,155,562 | 11/1964 | Pope | 156—504 |

EARL M. BERGERT, *Primary Examiner.*

J. C. GIL, *Assistant Examiner.*

U.S. Cl. X.R.

100—100, 226, 257; 156—583